No. 868,465. PATENTED OCT. 15, 1907.
M. M. MAUCK.
COMBINED BUCKET AND COOKER.
APPLICATION FILED JULY 5, 1906.

2 SHEETS—SHEET 1.

Witnesses
Charles Parker
C. H. Griesbauer

Inventor
M. M. Mauck.
by H. R. Wilson & Co.
Attorneys

No. 868,465. PATENTED OCT. 15, 1907.
M. M. MAUCK.
COMBINED BUCKET AND COOKER.
APPLICATION FILED JULY 5, 1906.
2 SHEETS—SHEET 2.
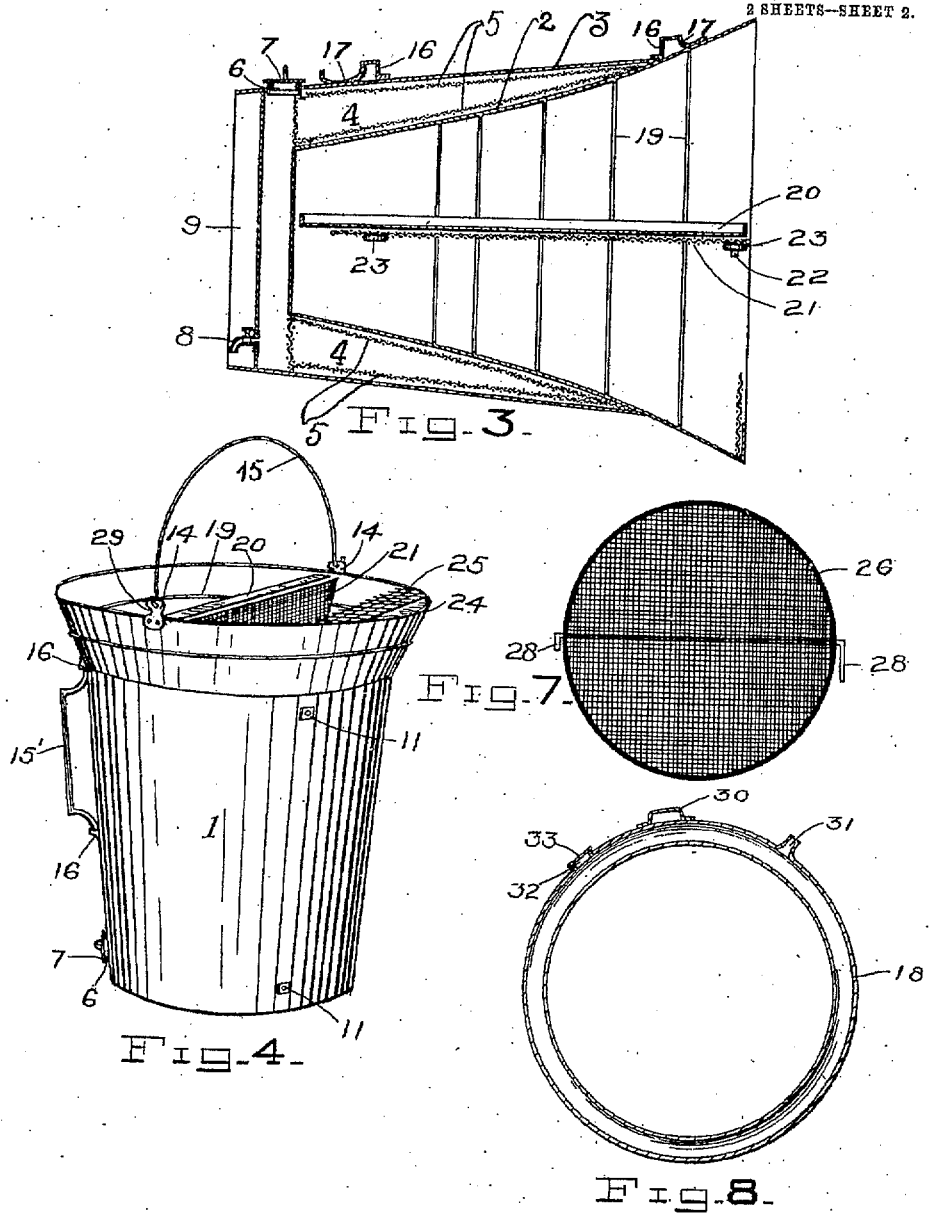

UNITED STATES PATENT OFFICE.

MARCELLUS M. MAUCK, OF ATLANTA, GEORGIA.

COMBINED BUCKET AND COOKER.

No. 868,465.     Specification of Letters Patent.     Patented Oct. 15, 1907.

Application filed July 5, 1906. Serial No. 324,836.

*To all whom it may concern:*

Be it known that I, MARCELLUS M. MAUCK, a citizen of the United States, residing at Atlanta, in the county of Fulton and State of Georgia, have invented certain new and useful Improvements in a Combined Bucket and Cooker; and I do declare the following to be a full, clear, and exact description of the invention, such as will enable others skilled in the art to which it appertains to make and use the same.

My invention is a combination device for use in cooking, baking, broiling, roasting and heating foods of various kinds; and also for carrying and measuring any kind of liquid or dry material.

The object of the invention is to provide a device of this character, of simple, strong, durable and comparatively inexpensive construction, which will be adapted for a great variety of uses and which will be convenient and easy to handle and operate.

With the above and other objects in view, the invention consists of certain novel features of construction, combination and arrangement of parts hereinafter described and claimed.

Figure 1:
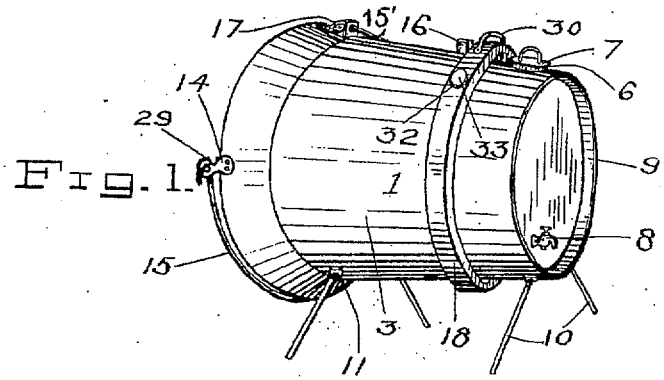
Figure 2:
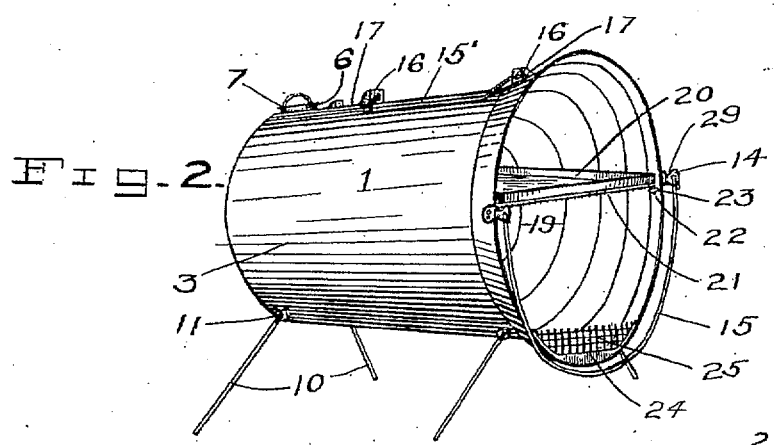
Figure 5:
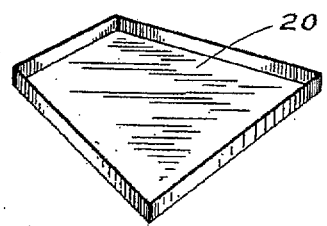
Figure 6:
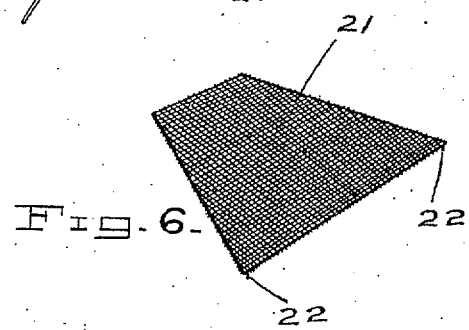

In the accompanying drawings:—Figure 1 is a perspective view of the invention set up for use as a cooker; Fig. 2 is a similar view of the same, looking towards its opposite end; Fig. 3 is a vertical longitudinal sectional view through the same; Fig. 4 is a perspective view of the device adapted for use as a water bucket or measure; Fig. 5 is a perspective view of the pan; Fig. 6 is a similar view of the shelf or tray upon which the pan is supported; Fig. 7 is a view of the cover for the device, and Fig. 8 is a sectional view through one of the removable annular liquid heating receptacles.

Referring to the drawings by numeral, 1 denotes my improved combined bucket and cooker, which consists of inner and outer casings 2, 3 suitably spaced apart and connected together to provide a liquid containing space 4 between them. The outer receptacle or casing 3 is somewhat shorter than the inner one 2, which latter is preferably more tapered, so that the water space 4 gradually diminishes from its bottom to its top. Within this water space is arranged a wire netting partition 5, which has portions in contact with the inner faces of both of the casings 2, 3, so that it will radiate the heat of the same and cause the water or other liquid within the space 4 to become quickly heated. A liquid of any kind may be introduced into the space 4 through a filling opening 6 adapted to be closed by a removable cover 7 and preferably of sufficient size to permit of the insertion of an egg, so that eggs may be boiled in the water in said space 4. The water or other liquid in the space 4 may be drawn off from the same through a faucet provided upon one side of the device, but I preferably provide a faucet 8 upon the bottom of the outer receptacle 3. An annular flange 9 upon the bottom of this outer receptacle is adapted to guard the faucet 8 and serve as a base on which the device may rest when it is used as a bucket or measure, as shown in Fig. 3 of the drawings.

When used as a cooker, the device is supported upon four or more legs 10, which have their upper ends screw-threaded to enter threaded sockets 11 provided at suitable points upon the outer casing 3. These legs may be readily removed by unscrewing them from their sockets when it is desired to use the device as a bucket or measure. A bail 15 is secured to the top or open end of the vessel by means of ears 14 in the ordinary manner, which, when the vessel is lying horizontally for use as a cooker, hangs down out of the way, as shown in Figs. 1 and 2, to give access to the interior but which stands upright, as shown in Fig. 4, when the vessel is to be carried as a bucket. A bail handle 15′ is provided upon the outer side of the casing 3 at a point opposite that where the sockets 11 are located, so that the handle 15′ will be uppermost when the device is used as a cooker and supported upon its legs. This handle 15′ is pivotally mounted in brackets 16 provided upon the casing 3 and shaped to provide hook like supports 17 for removable liquid heating receptacles 18. The inner receptacle or casing 2 is formed with a series of annular grooves 19 which serve as graduation marks and permit of the use of the device as a measure for either liquid or dry substances. These graduations may be arranged to indicate any desired measures. When the device is to be used for roasting meat or the like, a pan 20 is removably supported in a horizontal position within the inner receptacle or casing 2, as clearly shown in Fig. 3 of the drawings. This pan is shaped to fit said inner casing 2 and is supported upon an open shelf 21 which is also removably supported within the casing 2 and is in the form of a wire frame cover with a woven wire fabric. At its corners are provided downturned studs 22 adapted to enter eyes 23 arranged within the casing 2. It will be noted that when the pan is removed from its shelf 21, the latter may be used for broiling meat or the like. In order to collect any drippings from the pan 20, a segmental shaped plate 24 is provided at the open edge of the casing 2, upon one side, as shown. An open work or woven wire guard 25 is arranged above the plate 24, so that apples, potatoes or the like may be retained in the casing 2 to permit them to be roasted or baked. In order to prevent insects, dirt and the like from getting into the casing 2, I provide a removable cover 26 which may be in the form of a solid circular plate, or as shown in the drawings, in the form of an annular ring covered by wire netting. This cover 26 has extending across its center, a cross bar formed with downwardly bent ends 28 adapted to hook in notches 29 formed in the bail supporting ears 14. It will be understood that any number of the shelves and pans may be provided within the casing 2 and that any number of liquid heating rings 18 may be employed. Each of these rings 18 is in the form of a hollow annular receptacle provided with a handle 30, a discharge spout 31 and a filling opening 32 closed by a removable cover 33. They are adapted to contain water, coffee, chocolate or the like which is to be heated or kept warm.

The uses to which the invention may be put are innumerable, but it will be readily seen from the foregoing description taken in connection with the accompanying drawings, that the device may be used for all kinds of cooking, baking, broiling, roasting and heating; also for carrying and measuring both liquid and dry substances. When used as a cooker, it is supported upon its legs and placed in front of a fire of any kind. It can be supported or suspended in front of a coal fire grate, a fire place where wood is burned, a heating stove, or a furnace. It may be successfully used by families or parties keeping bachelor's quarters, camping out parties, soldiers while in camp, surveying parties, locomotive engineers and firemen, and the like. It is of simple, strong and durable construction, so that it may be manufactured at a comparatively small cost. It is convenient to handle and to carry.

While I have shown and described the preferred embodiment of the invention, it will be understood that I do not wish to be limited to the precise construction herein set forth, since various changes in the form, proportion and the minor details of construction may be resorted to without departing from the principle or sacrificing any of the advantages of the invention, as defined by the appended claims.

Having thus described my invention, what I claim as new and desire to secure by Letters-Patent is:—

1. A combined bucket and cooker comprising an outer casing open at one end, an inner casing open at one end and disposed in said outer casing, said inner casing having a flared outer end and tapering toward its bottom, and wire nettings arranged adjacent to the inner wall of said outer casing and the outer wall of said inner casing and extended laterally to form a transverse partition between said casings.

2. In a cooker, the combination of a vessel open at one end and provided with means for supporting it in a horizontal position, ears arranged at said open end and upon one side thereof, the ears arranged on the side of said vessel being hook-shaped, independent receptacles removably supported on said hook-shaped ears, and bails pivotally connected with said ears.

3. In a cooker, the combination of a vessel open at one end and provided with means for supporting it in a horizontal position, a hook-like support attached to the outer face of said vessel, and a hollow annular receptacle encircling said vessel and engaged with said support, said receptacle having an opening provided with a removable closure.

4. In a cooker, the combination of a vessel open at one end and provided with means for supporting it in a horizontal position, a hook-like support attached to the outer face of said vessel, and a hollow annular receptacle encircling said vessel and engaged with said support, said receptacle having a filling opening provided with a removable closure and a discharge spout.

In testimony whereof I have hereunto set my hand in presence of two subscribing witnesses.

MARCELLUS M. MAUCK.

Witnesses:
  THOMAS BISHOP,
  LEE J. LANGLEY.